S. Z. HALL.
Churn.
No. 43,686.
Patented Aug. 2, 1864.
Fig. 1,
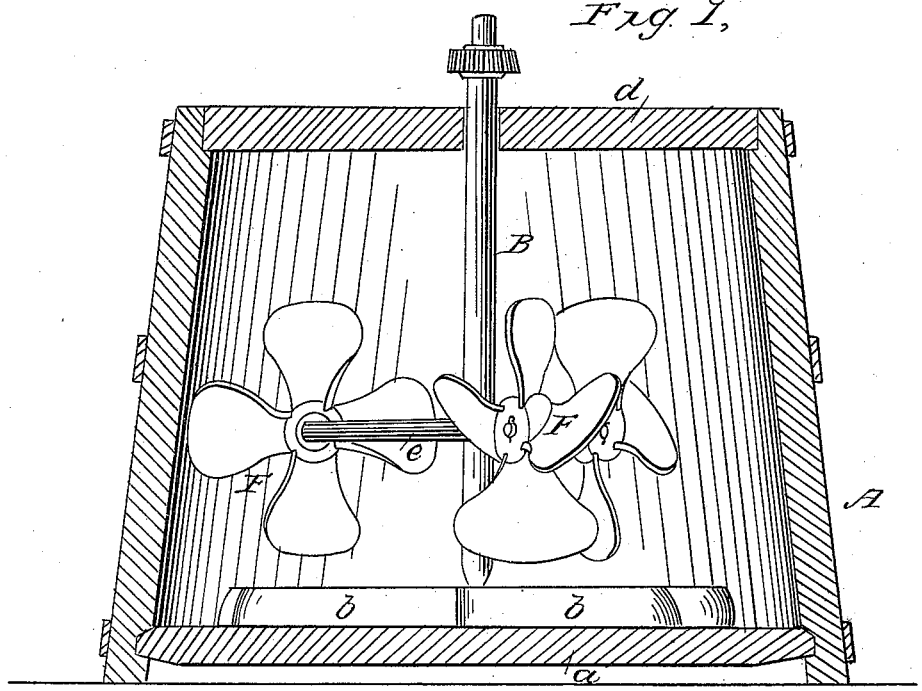
Fig. 2,
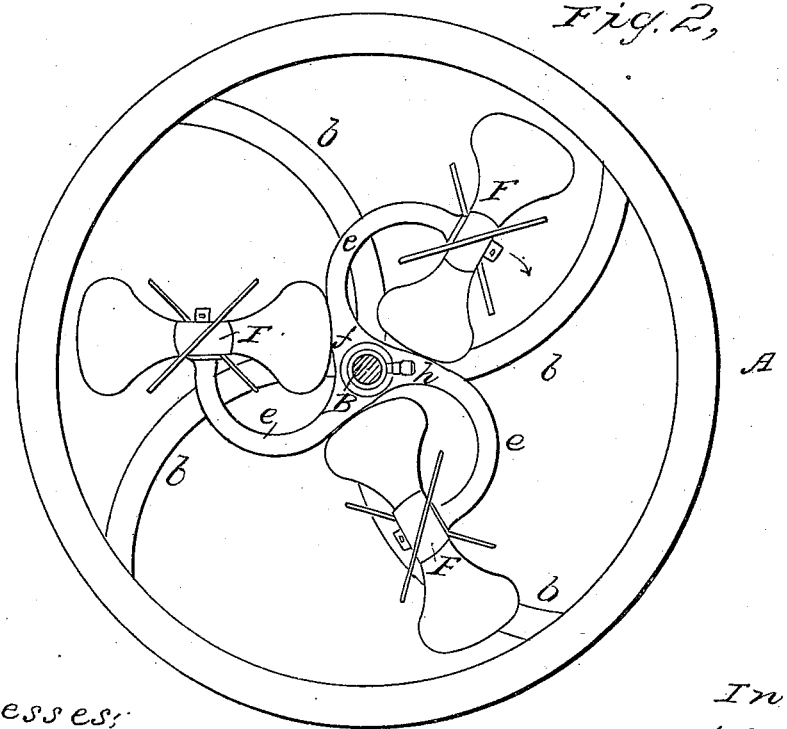
Witnesses:
Inventor:

UNITED STATES PATENT OFFICE.

S. Z. HALL, OF CAMDEN, NEW JERSEY.

IMPROVEMENT IN CHURNS.

Specification forming part of Letters Patent No. 43,686, dated August 2, 1864.

*To all whom it may concern:*

Be it known that I, S. Z. HALL, of Camden, Camden county, New Jersey, have invented an Improvement in Churns; and I do hereby declare the following to be a full, clear, and exact description of the same, reference being had to the accompanying drawings, and to the letters of reference marked thereon.

My invention relates to that class of barrel-churns in which a vertical revolving spindle carrying flutter-wheels is used, my improvements, which are fully described hereinafter, having been made with the view of producing the contrary currents of cream so necessary in producing butter rapidly.

In order to enable others skilled in the art to make and use my invention, I will now proceed to describe its construction and operation.

On reference to the accompanying drawings, which form a part of this specification, Figure 1 is an elevation of my improved churn, the barrel being shown in section by red lines. Fig. 2 is a sectional plan view of Fig. 1.

Similar letters refer to similar parts throughout the several views.

A represents the barrel of the churn, on the bottom, *a*, of which rest the four curved arms or ribs, *b*, which are connected together, and which fit into the barrel of the churn in such a manner that they cannot be turned round, but can be readily withdrawn vertically from the barrel. At the central point, where the four arms are secured to each other, a conical recess is formed for the reception of the tapering lower end of the spindle B, the latter passing through and turning in the top *d* of the barrel, and a rotary motion being imparted to the spindle through any suitable system of gearing or other driving apparatus. Three bent arms, *e e e*, meet each other at the central hub, *f*, through which passes the spindle B, a set-screw, *h*, passing through the hub and bearing with its end against the spindle, so that the three arms may be raised or lowered on the said spindle and secured after adjustment. On the end of each of the three bent arms a flutter-wheel, F, is arranged to turn freely.

As similar wheels have been heretofore used in connection with churns, it will suffice here to remark that each consists of four blades united at a central hub, and that the wheels are otherwise constructed in a manner somewhat similar to the ordinary propellers of steam-boats. The spindle B, with its curved arms and flutter-wheels, is caused to revolve in the direction of the arrow, Fig. 2, thereby imparting to the cream an outer movement toward the inside of the barrel, and at the same time a rotary movement in the same direction as the spindle. The cream consequently impinges against the concave edges of the curved ribs *b*, which direct it toward the spindle, so that as the latter, with its flutter-wheels, revolves, there are two influences at work, one to drive the cream outward from the spindle and the other to drive it inward toward the spindle. The cream is thus thoroughly agitated and rapidly converted into butter.

It is important that the arms *e e e* admit of ready vertical adjustment, for when a small quantity of cream has to be churned the arms, with their wheels, should be depressed, but when the barrel is nearly full of cream the arms should be elevated.

I wish it to be distinctly understood that I do not desire to claim, broadly, the use of the flutter-wheels F, arranged to turn on curved arms attached to a spindle rotating within a barrel; but

I claim as my invention and desire to secure by Letters Patent—

Any convenient number of curved ribs *b*, arranged on the bottom of the barrel, in combination with the spindle B, arms *e e e*, and their flutter-wheels F.

In testimony whereof I have signed my name to this specification in the presence of two subscribing witnesses.

S. Z. HALL.

Witnesses:
 HENRY HOWZON,
 CHARLES HOWSON.